March 7, 1933.  J. E. LILIENFELD  1,900,018
DEVICE FOR CONTROLLING ELECTRIC CURRENT
Filed March 28, 1928  3 Sheets-Sheet 1
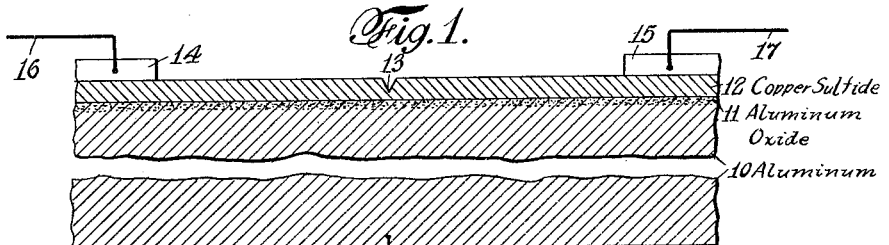
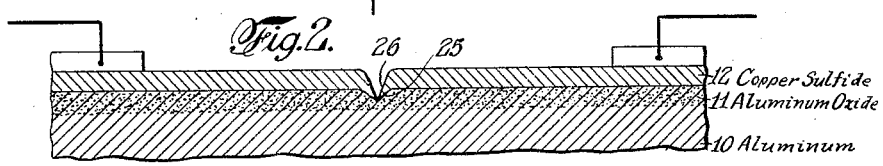
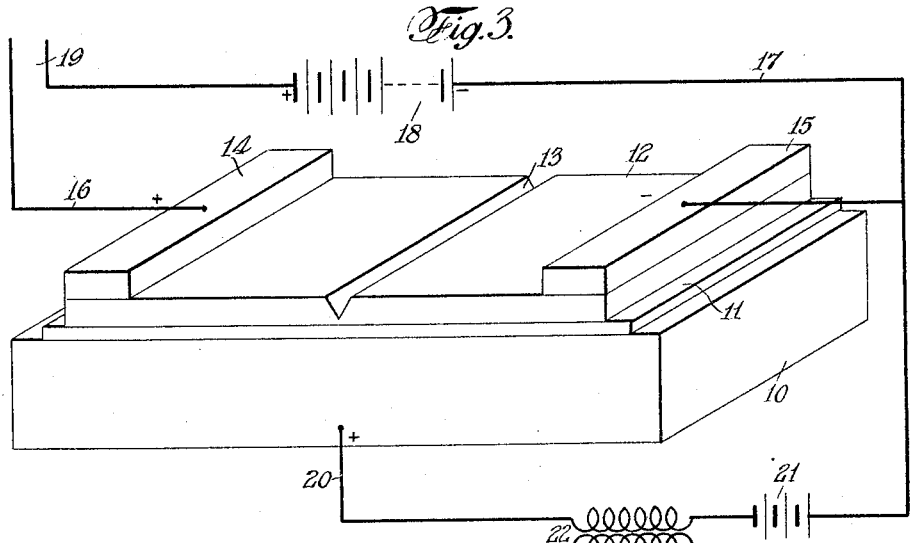
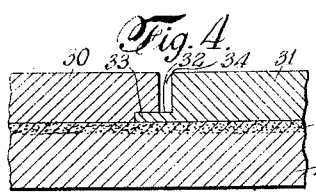 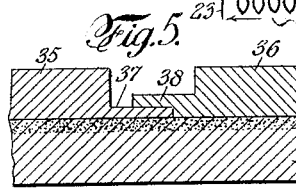 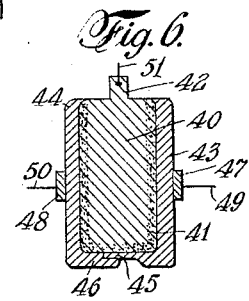
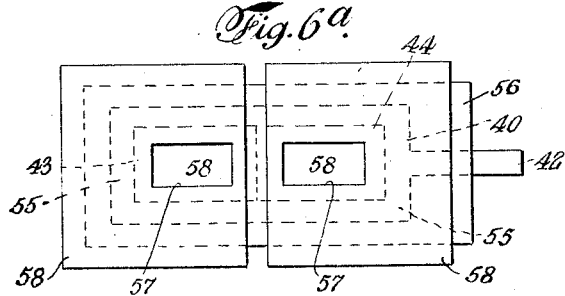
INVENTOR
Julius Edgar Lilienfeld
BY
ATTORNEY March 7, 1933.   J. E. LILIENFELD   1,900,018
DEVICE FOR CONTROLLING ELECTRIC CURRENT
Filed March 28, 1928   3 Sheets-Sheet 2
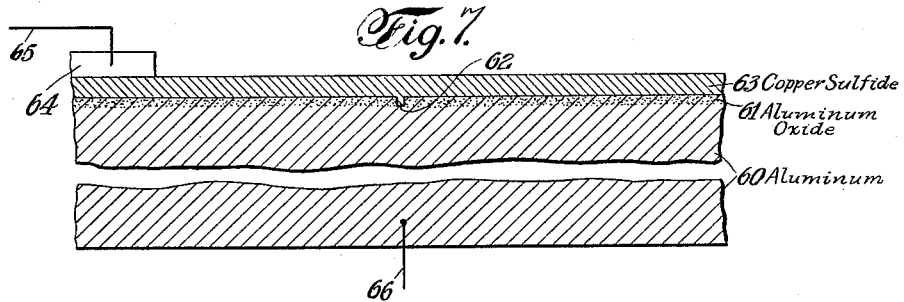
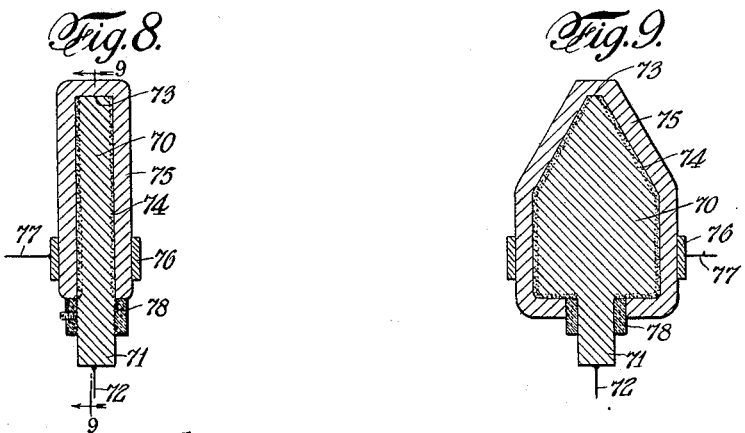
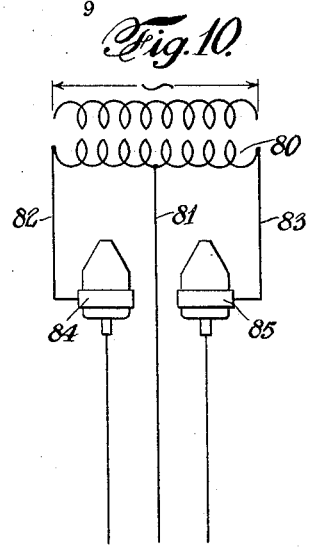
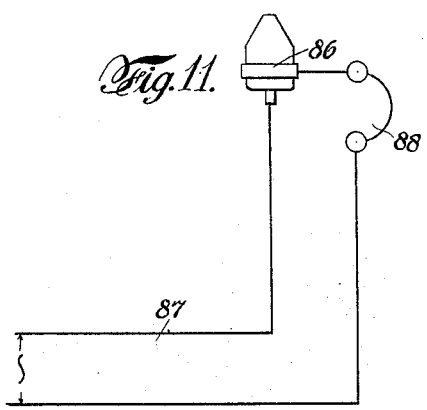
Inventor
Julius Edgar Lilienfeld
By his Attorney

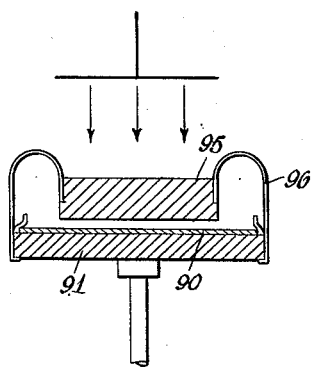
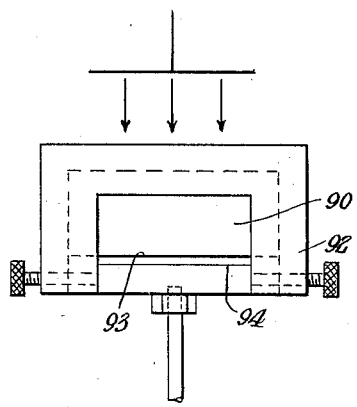
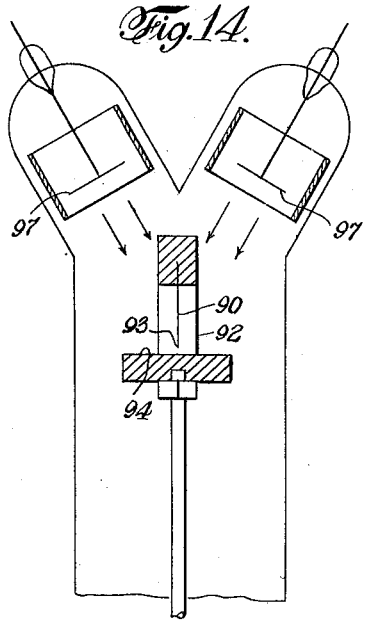

Patented Mar. 7, 1933

1,900,018

UNITED STATES PATENT OFFICE

JULIUS EDGAR LILIENFELD, OF BROOKLYN, NEW YORK

DEVICE FOR CONTROLLING ELECTRIC CURRENT

Application filed March 28, 1928. Serial No. 265,372.

The invention relates to a device for use in connection with electric circuits, more particularly in the variation of the current characteristics thereof, for example, as a novel amplifier or rectifier (detector) element to be included in a suitable circuit.

It has for its object the provision of a simple, compact and substantial device of this character which withal shall be comparatively inexpensive to construct. The novel device may embody, for example, an amplifier in the use of which no filament heating or electron-producing means of this character are required, which device, moreover, may be operated under much lower voltage conditions than heretofore. Likewise, it is also adaptable to the rectification (detection) of oscillating currents.

If a coating of compounds of a metal, for example, the oxide of aluminum, magnesium, tantalum, tungsten, etc., be provided partly or entirely over a surface of the respective metal selected, or an alloy of several of these metals, an insulating layer having high dielectric properties may be attained; and I have discovered that an extremely intensive electric field may be established in a minute thickness of this layer, provided a further layer or coating of substantially more conductive material be integrally associated therewith by applying this material in disintegrated or finely subdivided state, e. g. by spraying or by spattering it cathodically in a vacuum from such metals as copper, lead, aluminum, etc., over said dielectric layer. Or, said layer may be applied by colloidal precipitation, it being understood that substantially molecular contact over the whole area is had between it and the dielectric layer.

Under these circumstances, such insulating layers, I also have discovered, do not possess the rectifying properties similar to those which are shown by different combinations, for example, when aluminum oxide is deposited on an aluminum electrode of an electrolytic cell with ammonium borate as electrolyte; on the contrary, the layers show insulating properties for voltages applied in either direction.

The underlying or base material is preferably of relatively thin metal, approximately 0.03 mm. or less to prevent, in case of bending distortion of the same and injury to the superposed layers.

In some cases it may be advisable to apply in succession in the manner indicated more than one coating partly or wholly over the first and insulating layer in order to increase the effectiveness of the insulation, a final coating of particularly good conducting quality, as of silver, platinum, tin, nickel, aluminum, etc., however, being generally provided so as to secure a good contact for the outside lead. These coatings, in particular as well as in certain instances also the initial coating, may be precipitated from colloidal metal suspensions; or they may be "metal-sprayed."

The dielectric layer or layers when thus coated maintains its highly insulating property, affording a substantial insulation between the said underlying metal and the said coating or coatings; so that it is possible to apply voltages of the order of magnitude of 100 volts across a dielectric thus produced and of a thickness of the order of magnitude of only $10^{-4}$ mm. without puncturing it. In fact, the device will in many instances possess self-healing properties. In the aluminum-aluminum oxide embodiment with an oxidizable layer of copper, aluminum, magnesium, etc., short circuits will disappear as soon as the device is momentarily subjected to load.

This is a possible explanation of the fact, which I have discovered, that the allowable voltage appears to be a function not only of the nature and thickness of this dielectric layer but also of the physical and chemical properties of the superposed coatings. A coating produced by spattering from a copper cathode over the dielectric layer, for example, imparts to the layer the property of withstanding a higher voltage than silver similarly applied. These more effective coatings, however, may, in some cases, not be very highly conductive; and it is, therefore, sometimes desirable to provide more than one coating over the layer, the outer of them to possess a particularly good conducting quality and the same may be applied in any suitable manner, for example, electrolytically.

The dielectric layer may readily be attained of this minute thickness by electrolytic or by purely chemical methods, e. g. heat oxidation, sulfurization, etc., forming the same of and directly on the metal base; and a dielectric layer consisting of the oxide of aluminum thus formed directly of an underlying solid conducting base of aluminum has been found very satisfactory for the purpose. Over this layer is to be provided the superposed coating of substantially greater conductivity than the dielectric, and suitable provision is to be made for affording electrical connection on the one hand with the base element and on the other hand with the conducting coating located about the intermediate dielectric.

In many cases, very satisfactory results are had with the superposed coating consisting partly or wholly of a compound of certain metals; and this may be attained in different ways. For instance, if a metal, e. g. copper, electrode is used in spattering, layers of different natures may be obtained according to the gas filling of the spattering container as well as to the electrical conditions prevailing therein. Thus, either a pure metallic layer, (Cu), layer of a compound ($Cu_2O$) or, preferably, a mixture of both may be produced directly by the spattering process.

On the other hand, compounds particularly suitable for this purpose may be obtained by subjecting a spattered coating to subsequent chemical treatment. For example, the coating initially deposited may be treated in sulfur vapor or with carbon disulfide in which elemental sulfur is dissolved; or, it may be subjected to oxidation by heat treatment or to oxidizing reagents, e. g. $H_2O_2$ etc.; or it may be treated, as in the case of a coating of lead, in vacuo with atomic oxygen in order to convert it into $PbO_2$.

This discovery of the insulating property of a minute layer provided as aforesaid, enables one to subject a conducting layer of extreme thinness (approaching molecular thickness) throughout its full volume to a very strong electrostatic field, for example, in the provision of an amplifier device. In its design for this particular use, the coating provided over the dielectric need not be of uniform thickness throughout, but is to be modified to the extent that at least an extremely narrow portion thereof and located, for example, transversely across the surface of the device to afford a line of complete demarcation between the two separated coating portions, is reduced to a degree approaching molecular thickness. Or, the gap may be omitted and the entire coating possess molecular thickness only. A predetermined potential, also, is to be applied to the underlying solid conductor so that by this expedient a high electrostatic field is set up, or rather rendered available. The conductivity of such coating portion or layer of minute thickness will depend then upon the electrostatic field applied across the insulating intermediate layer. Incoming oscillations will modify this field and affect thereby changes in the conductivity of the conducting layer of molecular thickness, which variation may be used for amplification purposes in manner well understood.

If the device be intended for use as a rectifier (detector) of alternating or oscillating currents, the insulating layer itself is punctured or broken at a point or line through to the underlying conducting plate or strip. This produces a conductive connection of a very definite but minute area between the underlying solid conductor and said conducting coating. Moreover, the specific arrangement admits, when voltage is applied to the two conducting elements, of a current to pass freely in the one direction through the said wall contacting-area but to be substantially impeded in the other direction and thus conforming to the requirements of a rectifier (detector) for oscillating currents. By this expedient, a contact of a very definite and invariable characteristic is produced, which is a decided improvement over the usual solid contact detectors of uncertain performance.

It will readily be appreciated, furthermore, that when the intermediate layer of dielectric, provided between the base and a relatively more conductive coating, is of substantially uniform thickness throughout and not exceeding $10^{-4}$ mm. a highly efficient condenser is afforded which, I have discovered, has extremely high specific capacity; and, withal, the same is very permanent, rugged and compact. This feature of the invention, however, forms the subject of separate application for Letters Patent, filed by me of even date herewith.

The invention contemplates, also, a novel method for providing the devices hereinbefore set forth.

The nature of the invention, however, will best be understood when described in connection with the accompanying drawings, in which:

Fig. 1 is a fragmentary vertical section through the novel amplifier device, greatly magnified and on a disproportionate scale for purpose of illustration.

Fig. 2 is a similar view illustrating a modification.

Fig. 3 is a perspective view illustrating the novel amplifier device and shows diagrammatically the electrical connections involved.

Figs. 4 and 5 are fragmentary vertical sections through the amplified device and illustrate further modifications therein.

Fig. 6 illustrates in vertical section a practical embodiment of the invention, but on greatly magnified and disproportionate scale.

Fig. 6a is a plan view of a further embodiment.

Fig. 7 is a fragmentary vertical section, similar to Fig. 1, and illustrates a further modification whereby the device is rendered suitable for use as a rectifier (detector) of alternating or oscillating currents.

Fig. 8 is a longitudinal section on a greatly magnified and disproportionate scale of a rectifier element; and Fig. 9 is a transverse vertical section therethrough taken on the line 9—9, Fig. 8.

Figs. 10 and 11 are diagrammatic views illustrating the application of the device respectively as a rectifier and detector.

Fig. 12 is a front elevation of the apparatus illustrating the method of applying cathodically a coating or stratum of conductive material to the novel electrical device.

Fig. 13 is a front elevation of a different form of apparatus employed in applying cathodically the said coating or stratum; and Fig. 14 is an end view, partly in section, illustrating a further modification in the method of application of said coating.

Referring to the drawings, 10 designates a metal such as aluminum, magnesium, tantalum, tungsten, etc. which forms the base or supporting element of the novel device; and in accordance with the invention, there is provided over a portion of one surface thereof, or over substantially the entire surface if desired, a non-conducting or insulating layer 11 which is formed as a compound of the particular metal forming the base member. For example, if aluminum be selected as the base member, the insulating layer 11 will be the oxide of aluminum ($Al_2O_3$), which may be provided thereon in any suitable and well-known manner as by electrolytic or purely chemical methods. If, in the former instance, a high voltage operation is required, it is advisable to employ voltages as high as possible; and when aluminum is utilized as the base material, the voltage in the electrolytic process will range up to 400 volts in an aqueous and up to 1500 volts in an alcoholic solution. This layer is then an integral part of the base material which is selected, also, to be of relatively thin stock—approximating 0.03 mm. or less, so that in case of bending of a completed amplifier unit there will be no serious distortion of said base member and resulting injury to said layer of oxide, as well as to further coatings hereinafter more fully set forth. The dielectric layer itself is to be of minute thickness only, or at least over a narrow portion thereof, being of the order of magnitude not exceeding approximately $10^{-4}$ mm., so that a very strong or intense electrostatic field may be set up by applying a suitable potential to the underlying base material 10.

Over the aforesaid layer of insulating material or oxide layer 11 is to be provided, and in a molecular contact with it over the total contact area, a superposed coating or stratum 12 of substantially greater conductivity than said coating and consisting of disintegrated or finely subdivided metal or metallic compounds, or mixtures of such metal and compounds.

These coatings may be attained by spattering cathodically from such metals as copper, lead, aluminum, etc.; or, by precipitation from colloidal metal suspensions or by pressure spraying. For example, the coating may consist of a layer of copper sulfide which may be applied thereto by cathodically spattering copper thereover and subsequent sulfurization thereof. Or, as hereinafter noted, coatings of various characteristics may be applied, it being essential only that at least an extremely narrow portion thereof and located, for example, transversely across the surface of the insulation 11 to afford a line of complete demarcation between the two thus separated coating portions, approaches molecular thickness.

In order to apply potential across this gap or depression affording a complete demarcation between the two coating portions, contact plates or blocks 14 and 15 are mounted thereover upon opposite sides thereof and to which leads 16 and 17 respectively may be connected. These leads, reference being had more particularly to Fig. 3 of the drawings, are included in a circuit embodying the direct current source of potential 18 and an output circuit 19 including apparatus (not shown) to which amplified current is to be supplied from the said source of potential 18. Similarly, a potential is applied through a conductor 20 to the base member 10 to polarize the same, preferably positively, from a suitable source of direct current potential 21, the negative side of which may be connected to the negative side of the source of potential 18, or grounded if desired. The conductor 20 includes also the secondary of a transformer 22 whose primary is connected to the input circuit 23 containing apparatus (not shown) producing or receiving current which is to be amplified by the apparatus hereinbefore described.

An intense electrostatic field is thus set up, or rather rendered available, at the depressed portion 13 of coating 12 throughout its full volume and controls the conductivity of the coating at said portion. Incoming oscillations delivered through the circuit 23 and transformer 22 into the amplifier unit will affect this field to cause thereby changes in said conductivity of the conducting layer, more particularly at its said depressed portion or portion of molecular thickness 13, which changes in conductivity effect variations in the current delivered to the output circuit 19, in manner well understood.

As hereinbefore noted, it is not essential that either the dielectric layer or the relatively more conducting coating superposed thereover be, over the entire extent of such layer and coating, of the minute thicknesses set forth; and in Fig. 2, the layer 11 of insulating material is indicated as of relatively substantial thickness but is provided with a depressed portion or groove 25 and coinciding with which is the depressed or grooved portion 26 of the substantially more conductive coating 12.

Moreover, reference being had more particularly to Figs. 4, 5 and 6 of the drawings, the outer more conductive coating may be varied to comprise differently constituted portions and the same may also be arranged to afford effects not only throughout the volume of a layer but also at its contact area with another, different layer. For example, reference being had more particularly to Fig. 4 of the drawings, the one portion 30 of the conductive layer provided over the oxide layer 11 of the aluminum base 10 may consist af aluminum while the other portion 31 may consist of copper disulfide ($Cu_2S$), lead dioxide ($PbO_2$), etc., or vice versa, the effect taking place at the contact area of the two layers as well as through the volume of one of them.

Other combinations may consist of copper for the portion 30 and copper oxide for the portion 31, etc; or, both of the portions may consist of metal or both of compounds of a more or less conductive nature. It will be observed, also, that the portion 31 is provided with a bottom extension or lip 32 which is of molecular thickness and fits a corresponding recessed portion 33 in the underface of the portion 30, a gap 34 remaining, of course, between portions 30 and 31, while the former portion also partly overlies the latter at the said lip portion. In this manner, a contact area is provided utilizing the surface effect.

In Fig. 5, a further overlapping arrangement is indicated, each portion 35 and 36 of the conductive coating being provided with a laterally extending lip, as the lips 37 and 38 respectively, affording a variation both in volume effect of both layers and in surface effect at their mutual contact area.

Another embodiment of the invention is indicated in the construction shown in Fig. 6 of the drawings, which illustrates in vertical section an amplifier unit constructed according to the arrangement described in connection with Fig. 4 of the drawings. In this embodiment, 40 indicates a centrally disposed base element, as of aluminum, about which is provided a layer of aluminum oxide 41 substantially covering the entire surface thereof with the exception of a projecting tongue 42. A substantially more conductive coating about the same is indicated by the coating 43, for example of copper disulfide, and the coating portion 44, as of aluminum. The former coating is indicated as provided with or tapering down to the lip portion 45 which is to be of molecular thickness, while the latter coating has a portion 46 overlapping the said lip. Terminal members 47 and 48 as of tin foil or the like are provided over the coatings 43 and 44 to which are connected conductors 49 and 50, respectively, for affording connection to the amplifier; and a conductor 51 is secured to the tongue 42 to polarize the element 40 of said amplifier.

While it has been found in the case of operation with lower voltages, that the contacts to the conducting coatings may be established by applying thereover a soft foil, as tin foil or the like, without further precaution, as shown in Fig. 6, for the operation under high voltages it is advisable to design the device in a manner such that the conducting coating should not touch the edges either of the underlying oxide coated aluminum or of the contact-making foil. To satisfy these conditions, reference being had to Fig. 6a, the aluminum is oxide-coated over the entire area (except tongue 42) as in the previously described embodiments, but the conducting coatings 43 and 44 are to be applied thereover to provide for a surrounding oxide margin 55 so that the edges of the coatings will be displaced somewhat from the corresponding edges of the oxide-coated aluminum base element 40. Furthermore, insulating wrappers 56 of paper, mica, etc. and having windows 57 therein slightly smaller than the coating may be wrapped about the coatings, the edges of the paper overlapping the outline or perimeter of said coatings; and over the respective windows are applied a pair of tin foil elements 58 for making contact through said windows with the corresponding coatings, a foil being pressed firmly through a window to insure good contact.

When the device is intended for use as a rectifier or detector of alternating or oscillating currents, reference being had more particularly to Figs. 7 to 9 inclusive, a similar underlying or base element 60, of metal, such as aluminum, is provided, and an insulating layer 61 as of aluminum oxide formed over a portion or the whole of one of its surfaces. In this embodiment, however, the insulating layer is punctured or broken over a very definite but minute area, as at the portion indicated at 62 so that a conductive material may be applied therethrough to make contact with the covered surface of the underlying base element 60. This contact may readily be effected by providing a substantially more conductive layer 63 over the insulating layer 61, the same extending through the break in said insulation to make direct and molecular contact with the base element 60, as aforesaid. This more conductive layer 63 may consist of a metal such as copper, aluminum, etc., or a compound thereof, or a mixture of a metal and a compound, and is readily applied thereto by spattering the same cathodically thereover or in any other suitable and well known manner, as by pressure spraying or by precipitation from colloidal suspension, or by electrolytic deposition, etc. In this instance, also, it is not essential that the said layer 63 be of extreme thinness, although to reduce bulk of apparatus this may be desirable. A terminal element 64 is provided to make contact with the layer 63 and to which element is connected a conductor 65 for applying to the rectifier or detector the current to be rectified or detected, the other connection being through a conductor 66 attached to the base element 60.

Figs. 8 and 9 indicate respectively in transverse and longitudinal vertical section a practical construction of the invention as embodied in a rectifier or detector device. As shown, the base element is constituted by the centrally disposed element 70 having a projecting tongue 71 to which an outgoing conductor 72 may be attached. At its upper end, the element 70 is tapered to a substantially narrow edge 73, the surrounding insulating layer 74 entirely enclosing said element except at this edge 73 and at the tongue portion 71, while about the entire central element with the exception of its tongue 71 and over the insulation layer 74 as well as the edge portion 73 of the base element, is provided the more conductive coating 75. About the latter is provided a terminal band or connection member 76 to which is attached a conductor 77 for connecting the unit for service. An insulating bushing or coating 78 is provided over the tongue portion and insulation layer to prevent short-circuiting of the centrally disposed element 70 and the outer coating 75.

Figs. 10 and 11 indicate, respectively, the arrangement of these novel rectifier units, more particularly of the type indicated in the Figs. 8 and 9, respectively, in a full wave rectification system and in a system for detecting oscillating currents. As shown in Fig. 10, the incoming current to be rectified is connected to a transformer 80 having a divided secondary with neutral lead 81 and between which and the other leads 82 and 83 are connected the novel rectifier units 84 and 85, respectively, and in manner well understood. As shown in Fig. 11, a detecting unit 86 is connected in series in a circuit 87 in which oscillating currents prevail, said circuit including suitable means for indicating or receiving the detected oscillations, for example, a pair of head phones 88.

In order conveniently to prepare the elements employed in the foregoing apparatus, I have found it desirable to spatter the coating or coatings over the base member by directing, for example a stream or streams, from a metallic electrode over or to opposite sides of the base element, such as a strip of aluminum which may be suitably supported or suspended within the container in which the cathodic spattering is conducted. Reference being had more especially to Fig. 12 of the drawings, this element is indicated at 90 as horizontally supported on and clamped to a conducting table or platform 91 while in Figs. 13 and 14 it is shown as held along three of its edges by means of a frame 92, its free edge 93 in the latter embodiments being set very closely to a surface 94. This surface is, preferably, highly polished and mirror-like so that the said edge may be set parallel thereto with great precision. In the embodiment illustrated in Fig. 12 there is mounted over element 90 a shadow casting object 95, the same being held by brackets 96 and located in the path of a stream of cathodically spattered matter directed to said element; or when the same is suspended, streaming by the same in the direction indicated by the arrows. In the latter instance, generally, this will result in a rather non-uniform distribution of the material constituting the coating, the same fading away before it reaches the edge 93 which is more or less remote from the source or spattering cathode. It is preferred, therefore, to slightly incline the beams of spattered material toward the element 90, for example, as indicated in Fig. 14, where the spattering cathodes 97 are located upon opposite sides of the strip 90 and are both slightly inclined thereto. This affords a practical means of control of the application of the coating to the base element, and the attainment of an appreciable coating substantially up to the edge 93 which is to be then graduated thereover for application more especially in the manner set forth in Figs. 4 to 6.

I claim:

1. An electrical device comprising a conducting solid material having on one surface an insulating layer of a thickness of the order of magnitude of $10^{-4}$ mm., and a superposed stratum of solid material integral therewith, of substantially greater conductivity and insulated from the conducting solid material by the said insulating layer.

2. An electrical device comprising a conducting solid material having on one surface an inorganic insulating layer of a thickness of the order of magnitude of $10^{-4}$ mm., and a superposed stratum of solid material integral therewith, of substantially greater conductivity and insulated from the conducting solid material by the said insulating layer.

3. An electrical device comprising a conducting solid material having on one surface an insulating layer of minute thickness and chemically formed of and on said underlying material, and a superposed stratum of solid material integral therewith, of substantially greater conductivity and insulated from the conducting solid material by the said insulating layer.

4. An electrical device embodying an integral strip of two strata of conducting solid material and an intermediate dielectric stratum of minute thickness and constituted as a compound of one of the two said strata, said dielectric stratum insulating the two strata of conducting materials from each other.

5. An electrical device comprising a metal body having a surface provided with a layer of a non-conducting compound of said metal chemically formed thereon, and a stratum including copper superposed thereover and insulated from the metal body by the said non-conducting compound.

6. An electrical device comprising a metal body having a surface provided with a layer of a non-conducting compound of said metal chemically formed thereon, a stratum of substantially greater conductivity superposed thereover and insulated from the metal body by the said non-conducting compound, and a metal foil making contact with the latter and insulated by the layer of non-conducting compound from the metal body.

7. An electrical device embodying an integral strip of two strata of conducting solid material and an intermediate dielectric stratum, and a coating of a non-tarnishing metal over an outer stratum.

8. An electrical device comprising a strip of aluminum having a surface provided with a layer of the said aluminum formed thereon as oxide, and a stratum of substantially greater conductivity superposed over the latter and insulated by the layer of oxide from the strip of aluminum.

9. A dry aluminum strip having a layer of oxide of aluminum of a thickness of the order of magnitude of $10^{-4}$ mm., and a solid conductive stratum thereover, integrally associated therewith and insulated by a layer of oxide from the strip of aluminum.

10. An electrical device comprising a strip of aluminum having a surface provided with a layer of aluminum oxide, and a stratum including copper superposed thereover and integral therewith.

11. An electrical device comprising a metal body, an insulating layer of a compound of said metal chemically formed of said metal over a surface thereof, and a conducting stratum of substantially greater conductivity provided thereon by cathodically spattering a metal.

12. An electrical device comprising a metal body having a projecting conducting tongue, and on a surface an insulating layer of minute thickness whose outer face has a superposed stratum of solid material of relatively greater conductivity, a coating of non-tarnishing metal over the latter, and a metal foil covering about the last-named coating affording contact means thereto.

13. An amplifier for electric current, comprising a conducting solid material, an insulating layer on a surface thereof, and a conducting stratum over the latter including a portion approaching molecular thickness.

14. An amplifier for electric current, comprising a conducting solid material, an insulating layer on a surface thereof, and a conducting stratum over the latter having a portion reduced to a degree approaching molecular thickness and affording a line of complete demarcation between two portions of said stratum.

15. An amplifier for electric current, comprising a conducting solid material, an insulating layer on a surface thereof, and a conducting stratum over the latter and having a narrow portion across the same approaching molecular thickness.

16. An amplifier for electric current, comprising a conducting solid material, an insulating layer on a surface thereof, a conducting stratum over the latter including a portion approaching molecular thickness, and means to apply a difference of potential across said portion.

17. An amplifier for electric current, comprising a conducting solid material, an insulating layer on a surface thereof, a conducting stratum over the latter including a portion approaching molecular thickness, means to apply a potential to the conducting solid material, and means to apply a difference of potential across said portion.

18. An amplifier for electric current, comprising a conducting material, an insulating layer on a surface thereof, a conducting stratum over the latter having a transverse depression therein of molecular thickness, and means to apply a difference of potential to the coating upon opposite sides of the depression.

19. An amplifier for electric current, comprising a conducting material, an insulating layer on a surface thereof, a conducting stratum over the latter having a transverse depression therein of molecular thickness, means to apply a difference of potential to the conducting stratum upon opposite sides of the depression, and means to apply a third potential to the conducting base material.

20. An amplifier for electric current, comprising a conducting solid material, an insulating layer on a surface thereof of minute thickness, and a conducting stratum over the insulating layer having a narrow portion approaching molecular thickness.

21. An amplifier for electric current, comprising a conducting solid material, an insulating layer on a surface thereof having a narrow portion of minute thickness, and a conducting stratum over the insulating layer having a narrow portion approaching molecular thickness and coinciding with part of the said narrow portion of the insulating cover.

22. The method of forming an electrical device of the character set forth, which comprises chemically forming upon a strip of metal an insulating layer thereof to a minute thickness only, and providing a substantially greater conductive stratum over the latter by cathodically spattering a metal thereon.

23. The method of forming an electrical device of the character set forth, which comprises chemically forming upon a strip of metal an insulating coating thereof to a minute thickness only, providing a substantially greater conductive stratum over the latter by cathodically spattering a metal thereon, and subsequently treating the spattered coating.

24. The method of forming an electrical device of the character set forth, which comprises electrolytically forming upon a strip of aluminum an insulating coating of aluminum oxide to a minute thickness only, and providing a substantially greater conductive stratum over the latter by cathodically spattering copper thereon.

25. In the method of forming an amplifier element of the nature set forth, the step of cathodically applying from a metal a graduated coating to a metal strip by directing a stream from said metal thereto at an angle and intercepting said stream over a portion of the strip.

26. The method of forming an amplifier element of the nature set forth, which includes cathodically applying from a metal a graduated coating to the element by directing two streams from said metal substantially parallel to the element to be coated and on opposite sides thereof.

27. The method of forming of a metal foil an amplifier element of the nature set forth, which embodies directing two streams of cathodically spattered conducting matter thereto and from opposite sides of the said foil.

28. A metal strip having a dielectric coating over its surface and a graduated metal coating thereover, integrally associated therewith and insulated by said dielectric coating from the metal strip.

In testimony whereof I affix my signature.

JULIUS EDGAR LILIENFELD.